Patented Sept. 10, 1935

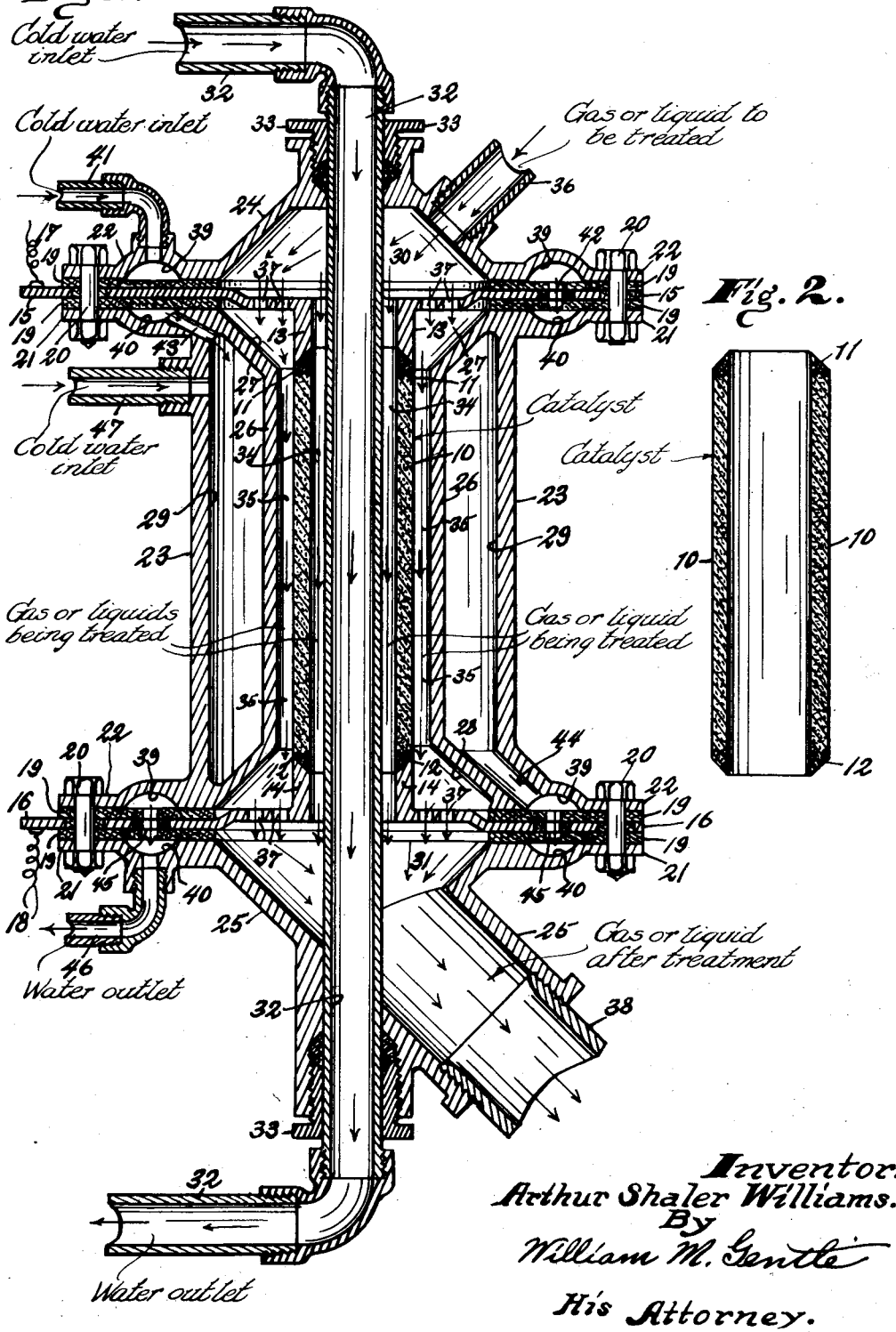

2,013,707

UNITED STATES PATENT OFFICE 2,013,707

CATALYTIC APPARATUS

Arthur Shaler Williams, Long Beach, Calif.

Application September 6, 1932, Serial No. 631,834

2 Claims. (Cl. 23—288)

This invention relates to a method of producing and controlling catalytic activity and relates particularly to my discovery that I can use the relatively common and abundant silicon carbides to produce a durable and highly efficient catalytic agent that has a wide range of uses; and the principal object of this invention is to provide a relatively inexpensive and durable catalytic agent that can be used effectively to reduce the cost of manufacture and improve the process of inducing chemical combinations, of disassociation of chemical combinations and of inducing conversion of physical states of matter.

To that end I have discovered that relatively inexpensive silicon carbides, like the component elements silicon and carbon, exhibit catalytic activity when embodied in proper form and heated, and also that the power or extent of the catalytic radiation effect or emanation from this composition of matter can be easily controlled by simply varying the temperature of the silicon carbides when in the uses hereinbefore stated.

A feature of invention is shown in converting masses of silicon carbide into forms that can be placed in an apparatus and heated to convert them into highly efficient agents of catalytic activity, which agents are easy to construct and install, highly efficient and durable in use, and which can be supplied in commercial quantities at a comparatively nominal cost.

Another object of the invention is to provide apparatus in which my catylic agents are used, which are so constructed and arranged that the walls of the catalyzing chambers are kept relatively free from deposits such as carbon and the like when used in disassociation of the components of hydrocarbon gases, vapors or liquids or like uses. To that end I arrange my apparatus so that there are thin annular passages around my catalyst, the containing metallic walls of which passages are maintained at a constantly lower temperature than that of the catalyst, and the fluid being treated, it being understood that the voluminous radiating activity of the catalytic agent effects or associates the disassociation of the components of the fluid while passing through the catalyzing chamber or channels.

A feature of the invention is shown in the construction, combination and arrangement of parts of the apparatus in which my new and useful catalyst is supported and used; whereby the material to be treated is separated into two flowing streams in close contact with the inner and outer walls of the catalyst so that substantially all of the material will be subjected to its radiating activity.

In detail this invention relates primarily to my discovery that silicon carbides, like unto the component elements silicon and carbon, exhibit catalytic activity when properly heated, and also that the power or extent of the catalytic effect or emanation, and which also may be and is hereafter termed catalytic radiation, can be controlled more or less by varying the temperature of the silicon carbides. What may be termed the normal or simplest molecule of silicon and carbon is SiC (carborundum) corresponding in a way to $CH_4$ (methane) in the petroleum series. But, as in the CH series there are a great number of stable molecules of CH combinations, so with silicon and carbon there is an extensive series of stable molecules, which I designate as silicon carbides, having various proportions of silicon and carbon, which I use in my catalyst. Silicon has a certain resistance to electric current and carbon has a different resistance, although they have the common characteristic of reducing their resistance (within certain ranges) with an increase of temperature. Making use of these characteristics I have been able to develop masses of molecules of varying proportions of silicon and carbon from which I have formed compact conductors for electrical currents having a wide range of resistance.

Thus, for example, by developing a mass of silicon-carbon molecules of proper quality into any desired form of electrical conductor, I can heat the mass by the passage of electric current through it to form a cheap and effective catalytic agent, and the temperature of the mass can be controlled to a nicety possible only with the accuracy and sensitivity of electric current variations, thereby correspondingly varying the catalytic radiation of the mass, and from actual experiments I have discovered that silicon carbides develop marked and increasing catalytic activity from about 600° F. up. I have also discovered that this new agent for catalytic radiation has a wide range of effect on different chemical structures. For example:

1st: It causes oxygen and hydrogen atoms to unite as $H_2O$ at much lower temperatures than they would combine without its influence.

2nd: It causes the disassociation of carbon atoms from hydrocarbon molecules at lower temperatures and pressure than would occur without its influence.

3rd: It causes the conversion of one form of a substance into another as in the conversion of amorphous carbon into graphite.

These varied activities of the silicon carbides when used as catalysts are mentioned by way of showing the wide range of usefulness of this new source of catalytic activity but the scope of its application in science, engineering and industry is by no means limited to these specific phenomena.

As a practicable apparatus for the development and application of the catalytic activity of silicon carbides the accompanying drawing is submitted as a novel and useful exposition of my invention.

In the drawing:

Figure 1 is a central vertical section through an apparatus showing a preferred form for applying catalysis.

Fig. 2 is a central vertical section through the catalyst separated from the apparatus.

In detail my apparatus for treating gases, liquids and the like includes a hollow cylindrical catalyst 10 that is formed of silicon carbides and has its ends provided with fused ring-like terminals 11 and 12 that preferably are beveled as shown so they can be fitted into the beveled ends of the oppositely arranged hollow cylindrical extensions 13 and 14 that are integral with the disk terminals 15 and 16 that are connected by the wires 17 and 18 with a source of electricity not shown but well understood.

The disk terminals 15 and 16 are arranged between insulating disks 19 that are secured by bolts 20 between the oppositely arranged annular flanges 21 and 22, the former flanges being integral with the housing 23 and the latter integral with the hollow cone-shaped heads 24 and 25.

The housing 23 includes an inner cylindrical wall 26 that has its end portions inclined outwardly into the outer wall, thereby to form a clearance or chamber 27 below the disk terminal 15, and also a chamber 28 above the disk terminal 16; and also this arrangement of the walls forms a cooling chamber 29 around the wall 26.

The heads 24 and 25 are hollow to form chambers 30 and 31 on the sides of the disks 15 and 16 opposite the chambers 27 and 28; and this construction and arrangement of parts is for the purpose of forming a clearance on opposite sides of the disks 15 and 16 so that they can be sprung slightly apart when the catalyst 10 is placed between the extensions 13 and 14 so the catalyst 10 is held under compression when in use.

A cooling pipe 32 is extended vertically and centrally through the catalyst 10 and heads 24 and 25 and is secured in the heads of the packing nuts 33 so that a cooling fluid can be passed through the center of the apparatus when in use. The pipe 32 is also arranged to form an annular passage 34 between its outer surface and the inner wall of the catalyst 10 that is similar to the passage 35 between the outer wall of the catalyst 10 and the inner surface of the wall 26 so that material fed into the apparatus through the pipe 36 will be divided with part passing through each of the passages 34 and 35.

The passage 34 is directly connected to the upper and lower chambers 30 and 31; and the disks 15 and 16 are provided with perforations 37 so that the material can pass first from the chamber 30 into chamber 27 and then through the passage 35 to the chamber 28 that is also connected by perforations 37 with the chamber 31. After the material has been subjected to the action of the catalyst 10 it passes from the chamber 31 through the pipe 38 to a proper apparatus for the segregation of the product or products of the catalyzing process.

The flanges 21 and 22 are curved outwardly adjacent the housing 23 and heads 24 and 25 to form annular cooling chambers 39 and 40 at each end of the apparatus to take off the heat from the disks 15 and 16; and these chambers are arranged so that the cooling fluid first enters the top chamber 39 through a pipe 41 and then by means of a by-pass 42 arranged on the opposite side of the apparatus the fluid enters the passage 40 and flows back toward its starting point where it enters the main cooling chamber 29 through a port 43 (see upper left hand corner of Fig. 1).

After passing downward through the chamber 29 the fluid enters the lower annular chamber 39 through a passage 44 (see lower right hand corner of Fig. 1).

In the lower part of the apparatus the annular chambers 39 and 40 are connected by the by-passes 45 so that both can discharge from the apparatus through the pipe 46.

An entry supply pipe 47 is provided for the chamber 29 so that an increased pressure can be applied to the cooling fluid circulating in the bottom portion of the apparatus if so desired.

With the parts constructed and assembled as described, material such as gases, vapors, liquids and the like, can be passed through the apparatus and by the catalyst 10 heated by an electrical current passed through the wires 17 and 19 so that the material will be acted on by the radiating activity of the catalyst and the desired chemical and physical conversions brought about.

From the foregoing it can be readily seen that the apparatus can be operated relatively continuously for the purpose of catalytic treatment of gas, fluids and the like in a highly efficient manner and with the dangers of high pressures and temperatures eliminated by the direct exposure of gases, fluids and the like in a comparatively thin annular stream to the catalytic radiation. In its specific use for the disassociation of carbon atoms (as lampblack or graphite) from hydrocarbons, the direct exposure of the gases or fluids to the heated catalyst, with the metal containing walls away from the heat source, results in the metal walls being always at a lower temperature than the gases or vapors, under which conditions the adherence of the disassociated carbon to the metal walls is avoided.

I claim as my invention:

1. An apparatus for developing catalytic activity including a housing having flanged ends, heads to said housing having flanges corresponding to the flanges on said housing, disk terminals having fluid passages therethrough, means for insulating and securing said disk terminals between the flanges of said heads and housing, hollow cylindrical extension terminals integral with said disk terminals that have beveled ends and are aligned and arranged opposite one another, a hollow cylinder formed of silicon carbides having end terminals yieldingly fitted to the bevel terminal ends of said cylindrical extension terminals, and means for passing an electrical current through said disk terminals, extension terminals and cylinder for the purpose specified.

2. An apparatus for developing catalytic activity including a cylindrical housing having flanged ends, heads to said housing having flanges corresponding to the flanges of said housing, disk terminals having fluid passages therethrough, means for insulating and securing said disk terminals between the flanges of said heads and housing, hollow cylindrical extension terminals integral with said disk terminals that have beveled ends and are aligned and arranged opposite to one another and centrally in said housing, a hollow cylinder formed of silicon carbide having end terminals yieldingly fitted to the ends of said cylindrical extension terminals, means for passing electrical current through said disk terminals and cylinder to heat said cylinder until it becomes catalytically active, and other means for passing material into said housing so it can pass over the outer and inner surfaces of said electrically heated cylinder.

ARTHUR SHALER WILLIAMS.